United States Patent
Geisler et al.

(10) Patent No.: US 10,892,824 B2
(45) Date of Patent: Jan. 12, 2021

(54) MULTI-SPATIAL MODE ENABLED PAT AND AO TERMINAL ARCHITECTURE FOR FREE-SPACE OPTICAL COMMUNICATIONS

(71) Applicant: Massachusetts Institute of Technology, Cambridge, MA (US)

(72) Inventors: David J Geisler, Watertown, MA (US); Timothy M Yarnall, Amherst, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/804,067

(22) Filed: Feb. 28, 2020

(65) Prior Publication Data

US 2020/0343973 A1 Oct. 29, 2020

Related U.S. Application Data

(60) Provisional application No. 62/839,956, filed on Apr. 29, 2019.

(51) Int. Cl.
*H04B 10/112* (2013.01)
*H04J 14/02* (2006.01)

(52) U.S. Cl.
CPC ...... *H04B 10/1127* (2013.01); *H04J 14/0221* (2013.01)

(58) Field of Classification Search
CPC ... H04B 10/1127; H04B 10/11; H04B 10/118; H04J 14/0221

(Continued)

(56) References Cited

U.S. PATENT DOCUMENTS 7,197,248 B1 * 3/2007 Vorontsov .......... H04B 10/1127
398/119
9,048,950 B2 6/2015 Chen et al.
(Continued)

FOREIGN PATENT DOCUMENTS

WO 2016047100 A1 3/2016

OTHER PUBLICATIONS

International Search Report and Written Opinion in International Patent Application No. PCT/US2020/020386 dated Jul. 1, 2020, 10 pages.

(Continued)

*Primary Examiner* — Dalzid E Singh
(74) *Attorney, Agent, or Firm* — Smith Baluch LLP

(57) ABSTRACT

Many free-space optical (FSO) communications systems use pointing, acquisition, and tracking (PAT) systems to align the transmit and receive apertures for efficiently coupling received light to a detector. Conventional PAT systems divert energy from the communications receiver to a photodiode array for measuring tilt in the focal plane. Unfortunately, diverting energy from communications to PAT reduces SNR and sensitivity for communications. The PAT terminal disclosed here determines tilt angle without diverting energy from the communications receiver. It tracks the power in different spatial modes and uses that power distribution to determine tilt information for PAT. It does this with a passive mode converter, such as a photonic lantern, that maps power in each spatial mode at the receive aperture to a different single-mode output. Photodetectors at the single-mode outputs convert the received light into electrical signals that are demodulated for communications and whose amplitudes are used to derive the tilt information.

20 Claims, 10 Drawing Sheets

(58) Field of Classification Search
USPC .......................................................... 398/96
See application file for complete search history.

(56) References Cited

U.S. PATENT DOCUMENTS

| | | | |
|---|---|---|---|
| 2002/0196506 A1* | 12/2002 | Graves ............... | H04B 10/1125 398/126 |
| 2003/0067657 A1 | 4/2003 | Dimmler et al. | |
| 2006/0024061 A1 | 2/2006 | Wirth et al. | |
| 2007/0031151 A1* | 2/2007 | Cunningham ..... | H04B 10/1123 398/131 |
| 2012/0008961 A1 | 1/2012 | Chen et al. | |
| 2015/0188628 A1 | 7/2015 | Chalfant, III et al. | |
| 2016/0119059 A1 | 4/2016 | Chandra et al. | |
| 2016/0277109 A1 | 9/2016 | Chaffee et al. | |
| 2017/0207850 A1 | 7/2017 | Takahashi et al. | |
| 2017/0299900 A1* | 10/2017 | Montoya ................. | H01S 3/005 |
| 2017/0371217 A1* | 12/2017 | Chu ......................... | G02F 1/141 |
| 2019/0074898 A1 | 3/2019 | Li | |

OTHER PUBLICATIONS

Plett, Free-Space Optical Communication Link Across 16 km to a Modulated Retro-reflector Array. Diss. Apr. 25, 2007. 88 pages.

Allioux, How to improve LaserCom through atmospheric turbulence? Cailabs Webinar Slides Jul. 2, 2019. 43 pages.

Arikawa et al. "Mitigation of Fading Caused by Atmospheric Turbulence with FMF Coupling and Maximum Ratio Combining Used in 320-m Free-Space Optical Transmission of." ECOC 2016; 42nd European Conference on Optical Communication. VDE, 2016, 3 pages.

Arikawa et al., "Performance of mode diversity reception of a polarization-division-multiplexed signal for free-space optical communication under atmospheric turbulence." Optics Express 26.22 (2018): 28263-28276.

Arikawa et al., "Mode diversity coherent receiver with few-mode fiber-coupling for high-speed free-space optical communication under atmospheric turbulence." Free-Space Laser Communication and Atmospheric Propagation XXX. vol. 10524. International Society for Optics and Photonics, 2018, 12 pages.

Calvo et al., "Alternative passive fiber coupling system based on multi-plane light conversion for satellite-to-ground communications," Free-Space Laser Communications XXXII, Editors: Hamid Hemmati and Don M. Boroson, SPIE vol. 11272-25, Mar. 5, 2020. 13 pages.

Fontaine et al., "Geometric requirements for photonic lanterns in space division multiplexing." Optics Express 20.24 (2012): 27123-27132.

Geisler et al., "Experimental demonstration of multi-aperture digital coherent combining over a 3.2-km free-space link." Free-Space Laser Communication and Atmospheric Propagation XXIX. vol. 10096. International Society for Optics and Photonics, 2017. 9 pages.

Geisler et al., "Ground Receiver Architectures Enabled by Digital Coherent Combining." Photonic Networks and Devices. Optical Society of America, 2018. 2 pages.

Geisler et al., "Multi-aperture digital coherent combining for free-space optical communication receivers." Optics Express 24.12 (2016): 12661-12671.

Geisler et al.,"Experimental comparison of 3-mode and single-mode coupling over a 1.6-km free-space link." Free-Space Laser Communication and Atmospheric Propagation XXX. vol. 10524. International Society for Optics and Photonics, 2018. 11 pages.

Geisler et al.,"Optical ground terminals using multi-aperture digital coherent combining." 2017 IEEE Photonics Conference (IPC). IEEE, 2017. 2 pages.

Vievard et al., "Large amplitude tip/tilt estimation by geometric diversity for multiple-aperture telescopes." JOSA A 34.8 (2017): 1272-1284.

Yarnall et al., "Analysis of free-space coupling to photonic lanterns in the presence of tilt errors." 2017 IEEE Photonics Conference (IPC). IEEE, 2017. 2 pages.

Zheng et al., "Performance enhancement of free-space optical communications under atmospheric turbulence using modes diversity coherent receipt." Optics express 26.22 (2018): 28879-28890.

* cited by examiner

MULTI-SPATIAL MODE ENABLED PAT AND AO TERMINAL ARCHITECTURE FOR FREE-SPACE OPTICAL COMMUNICATIONS

CROSS-REFERENCE TO RELATED APPLICATION

This application claims the priority benefit, under 35 U.S.C. § 119(e), of U.S. Application No. 62/839,956, filed on Apr. 29, 2019, which is incorporated herein by reference in its entirety.

GOVERNMENT SUPPORT

This invention was made with Government support under Grant No. FA8702-15-D-0001 awarded by the U.S. Air Force. The Government has certain rights in the invention.

BACKGROUND

Many free-space optical (FSO) communications systems require acquisition, pointing, and tracking (PAT) systems to align the transmit and receive telescope apertures to efficiently couple the received light to a detector or to optical fiber for subsequent detection. In particular, a PAT system should determine (and correct) the tilt angle error of a signal incident on an optical receive aperture. A conventional PAT system diverts energy from the communications receiver optical path and uses a lens followed by a photodiode array (e.g., quadrant detector photodiode or focal plane array) to convert tilt to position in the focal plane. Diverting energy for PAT is especially challenging for power-starved links (e.g., low data rate) on distant, or low size, weight, and power (SWAP) platforms. The X and Y position error signal then provides feedback to a control loop that corrects for the angular error. In some cases, systems may employ nested coarse and fine control loops or even more levels of nesting.

FIG. 1 shows a conventional laser communications (lasercom) tracking loop 100. A fast-steering mirror 110 steers a free-space optical beam from a telescope (beam compressor) 102 to fiber coupling optics (e.g., a mirror 116 and a lens 118) that couple the free-space optical beam into a single-mode fiber (SMF) 130. A beam splitter 112 directs a portion of the beam through another lens 114 for detection by a quad cell 120 or focal plane array (FPA) 122. The quad cell 120 detects the beam and provides tip/tilt error to a tracking controller 140 that steers the fast-steering mirror 110 for increasing the amount of the free-space optical beam coupled into the single-mode fiber 130. Alternatively, the FPA 122 can provide centroid tracking to the tracking controller 140 for actuating the fast-steering mirror 110. The quad cell 120 offers a balance between angular width (field-of-view) and linear tracking range resolution, whereas the FPA 122 offers a larger angular width for wide field-of-view and linear tracking at higher cost and complexity, and often with limitations in the bandwidth of the readout circuitry.

In contrast, the single-mode fiber 130 has an extremely narrow field of view and typically requires fine tracking (e.g., nutation) for efficient coupling. Coupling into the single-mode fiber 130 is challenging, yet worthwhile. It is useful for background rejection, enables the use of fiberized components, and provides a standard input for optical digital coherent receivers.

The PAT system 100 shown in FIG. 1 must work properly to couple enough light into the single-mode fiber 130 for the free-space optical communications link to be effective. Unfortunately, conventional PAT systems are complicated. They typically require mount/platform stabilization, fine tracking, and coarse tracking. More fundamentally, they divert signal power from communications to a quad cell, FPA, or other detector for PAT error measurements, reducing the signal-to-noise ratio (SNR) available for detecting the communications signal. At lower data rates or sensitivity levels, the PAT system may consume up to 50% of the incident optical power, which becomes prohibitive.

SUMMARY

Practical free-space optical communications with a transmitter or receiver on a moving platform depends on efficient PAT for coupling light into a single-mode fiber. Unfortunately, coupling light into a single-mode fiber is difficult and often inefficient, especially if a portion of the signal is tapped off for PAT instead of being used for communications.

Fortunately, photonic lanterns may alleviate some of the difficulties associated with conventional PAT system. To start, it is easier to couple light into the multi-mode input of a photonic lantern than into a single-mode fiber because the photonic lantern's multi-mode input has a larger effective core area, which results in a wider acceptance angle and lower insertion loss. The photonic lantern passively transforms each spatial mode coupled into the multi-mode input into separate single-mode outputs. In other words, the photonic lantern efficiently and repeatably maps energy from the spatial mode distribution at the multi-mode input to the single-mode outputs. These single-mode outputs can be detected coherently or incoherently and used for communications and fine tracking simultaneously.

Using a passive mode demultiplexer, such as a photonic lantern, mode converter, or Cailabs multi-plane light conversion device, to couple light into many single-mode fibers allows an optical terminal to determine tilt angle for fine tracking without diverting any power from the communication receiver path. As a result, it is possible to use energy detected from different spatial modes for both communication and tilt angle tracking, which is beneficial when the received signal power is low. For low data rate links, this is especially beneficial because it allows all of the energy to be used for communications thus avoiding situations in which some or most of the energy is used for PAT, as can happen with a conventional PAT system.

A passive mode demultiplexer (e.g., a photonic lantern) also increases the field-of-view (FOV) of the optical coupling elements by employing multi-spatial mode coupling. The increase in FOV of the optical coupling elements has a direct impact on optical terminal design by moving PAT system complexity from the optical head to backend digital signal processing (DSP). The backend DSP can implement combining of signals detected behind each spatial mode, which is also a digital implementation of adaptive optical (AO) compensation. Moving PAT complexity from the optical head to backend DSP potentially reduces overall system complexity.

An example of this type of PAT system may include a beam compressor (e.g., a telescope), an adaptive optical element in optical communication with the beam compressor, a passive mode demultiplexer (e.g., a photonic lantern) in optical communication with the adaptive optical element, photodetectors in optical communication with single-mode outputs of the passive mode demultiplexer, and at least one processor operably coupled to the photodetectors. In operation, the beam compressor receives the free-space optical communications beam that is being acquired and tracked.

The adaptive optical element modulates a wave front of the free-space optical communications beam. The passive mode demultiplexer performs a unitary mapping of spatial modes of the free-space optical communications beam to the single-mode outputs. The photodetectors transduce light at the single-mode outputs into electrical signals. And the processor actuates the adaptive optical element based on the electrical signals.

Each photodetector can have a bandwidth of at least 1 GHz. Alternatively, of the photodetectors, there may be a first photodetector having a first bandwidth to sense a power of the corresponding single-mode output and a second photodetector having a second bandwidth greater than the first bandwidth to sense a power of the corresponding single-mode output and to detect a modulation of the corresponding single-mode output. The first bandwidth can be less than 1 GHz and the second bandwidth can be at least 1 GHz.

The processor may include or implement a tracking controller to determine actuation of the adaptive optical element based on the electrical signals and a communications receiver to demodulate the electrical signals to provide a communications signal. The tracking controller can be configured to actuate the adaptive optical element based on an amplitude distribution of the electrical signals among the photodetectors.

The system may also include an input optical amplifier, in optical communication with an input to the passive mode demultiplexer, to amplify the free-space optical communications beam. Optional output optical amplifiers, which are in optical communication with the single-mode outputs, can amplify the light at the single-mode outputs.

If the free-space optical communications beam is a wavelength-division multiplexed (WDM) free-space optical communications beam, the system may include a wavelength division de-multiplexer, in optical communication with one of the single-mode outputs, to de-multiplex the corresponding single spatial mode.

The system can also include a local oscillator to interfere a local oscillator beam with at least one of the single spatial modes for coherent detection. The single spatial modes can also be detected incoherently.

Another version of the PAT system can include an adaptive optical element to modulate a wave front of a free-space optical communications beam in response to an error signal. A photonic lantern with a multi-mode input in optical communication with the adaptive optical element and supporting N spatial modes and having N single-mode outputs maps spatial modes of the free-space optical communications beam at the multi-mode input to single-mode outputs. (Here, N is a positive integer greater than 1.) A first photodetector, in optical communication with a first single-mode output of the photonic lantern and having a first bandwidth, generates a first electrical signal from light at the first single-mode output. A second photodetector, in optical communication with a second single-mode output of the photonic lantern and having a second bandwidth greater than the first bandwidth, generates a second electrical signal based on light at the second single-mode output. And at least one processor, operably coupled to the first photodetector and the second photodetector, generate the error signal based on amplitudes of the first electrical signal and the second electrical signal and demodulates a communications signal encoded in the free-space optical communications beam from the second electrical signal.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
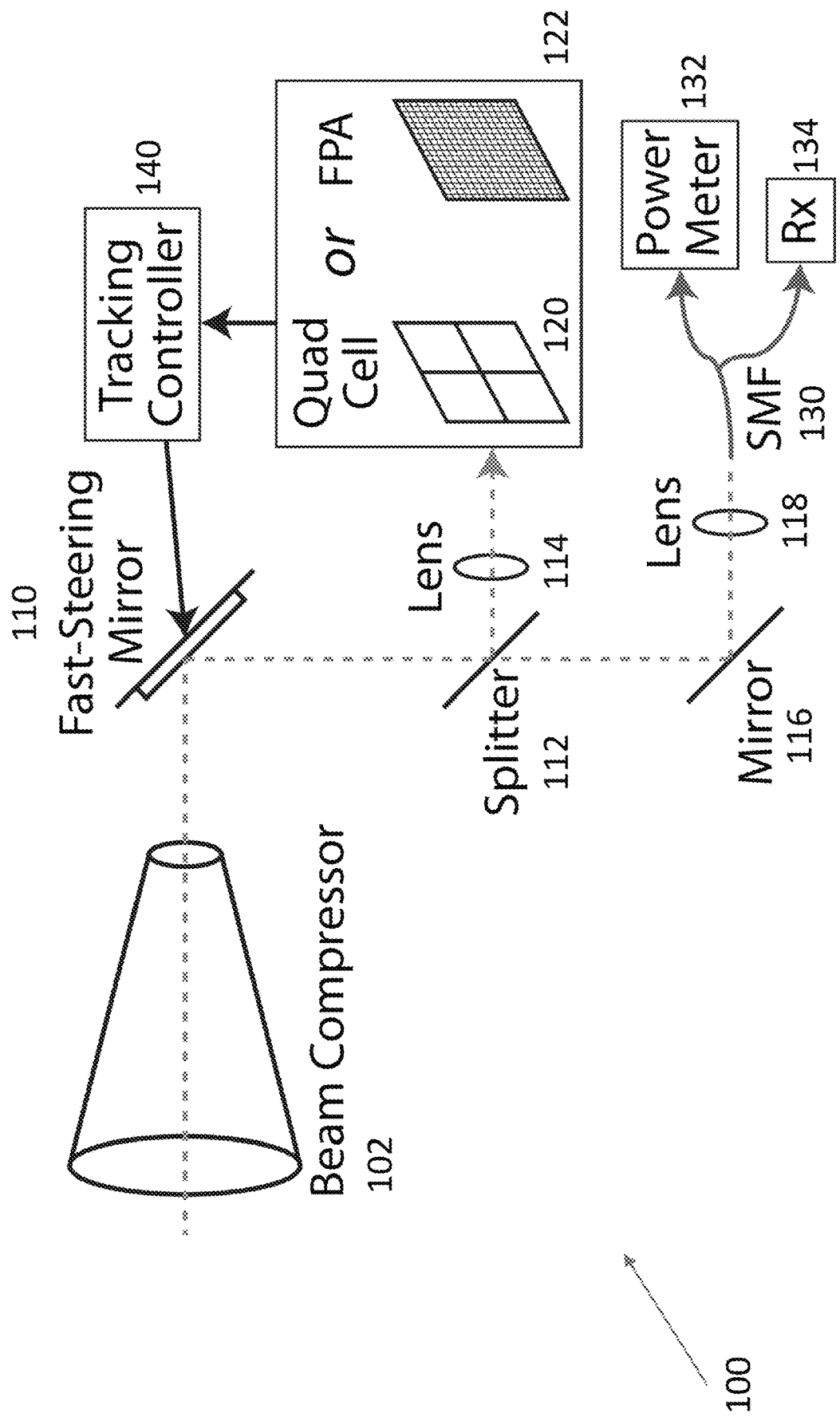
FIG. 1 illustrates a conventional pointing, acquisition, and tracking (PAT) system for free-space optical communications.

Multi-spatial mode pointing, acquisition, and tracking (PAT) technology can be used for determining tilt angle of an incident free-space optical communications beam without diverting energy from the communications receiver. In particular, the spatial tracking information in the focal plane can be determined by the relative amount of signal detected in different spatial modes. In this way, it becomes possible to increase or maximize the received energy for communications while simultaneously detecting tilt angle. There are multiple ways in which multiple spatial modes can be used to determine tilt angle information.

One technique involves coupling light from a receive aperture to a multi-mode fiber (MMF) or few-mode fiber (FMF). The light energy in the MMF or FMF is then separated into several single-mode fiber (SMF) outputs using a passive MMF-to-SMF or FMF-to-SMF convertor that has one SMF output for each spatial mode in the MMF or FMF. A passive spatial mode convertor can be implemented using a photonic lantern as described below or a mode demultiplexer that directs energy from the spatial modes in the FMF to respective output SMFs. The photonic lantern directs some energy from each FMF spatial mode into each output fiber, whereas the mode demultiplexer maps each FMF mode to the fundamental mode of a particular output fiber. With either a photonic lantern or a mode demultiplexer, the relative powers on each of the SMF outputs can then be used to determine the tilt angle information based on calibration information.

An alternate approach involves placing a near-gapless micro-lens array in a receive aperture's focal plane. Each cell in the near-gapless micro-lens array focuses light to a separate detection element, such as a large-area photodiode or single-photon detector. The signal can be detected coherently by projecting a heterodyne reference onto the detection elements with appropriate bulk optical components (e.g., lenses and mirrors). If desired, the micro-lens array can focus light onto an array of vertical grating couplers that enable an array of detectors to be on a photonic integrated circuit.

The energy detected by the receiver for each spatial mode can be combined incoherently to form a single signal for subsequent demodulation. Alternatively, in a mode-selective, multi-spatial mode architecture, a single receiver (either coherent or incoherent) can detect energy in one spatial mode. In a mode-selective, multi-spatial mode architecture, most of the energy in the photonic lantern's fundamental mode happens to come out of one or more SMF(s). This allows the coherent receiver to be put behind the SMF output(s) with the most energy when the receive aperture is co-boresighted with the incident signal. The other SMF output(s) can be sensed with simpler detectors, such as log amp photodetectors with wide dynamic ranges (e.g., 30 dB, 40 dB, 50 dB, 60 dB, or wider). In this case, energy in other spatial modes can be detected using single-ended photodiodes, which can be integrated with logarithmic amplifiers, to the determine tilt angle. This reduces the complexity of the receiver by replacing higher performance detectors for communication with lower performance detectors for sensing tilt error.

A multi-spatial mode terminal architecture can also implement adaptive optics (AO) digitally when the aperture diameter is larger than the atmospheric coherence length. The wide field-of-view (FOV) offered by multi-spatial mode detection enables detection of signals that are not diffraction-limited spots, but instead have been broken up as a result of spatial phase variations in the atmosphere. Using this technique, the larger the mode count of the detection, the more compensation for atmospheric spatial phase variations can be provided. In contrast, a conventional receive aperture with AO taps the signal to feed a wave-front sensor that provides a feedback signal to a deformable mirror in order to correct the wave front.

Figure 2:
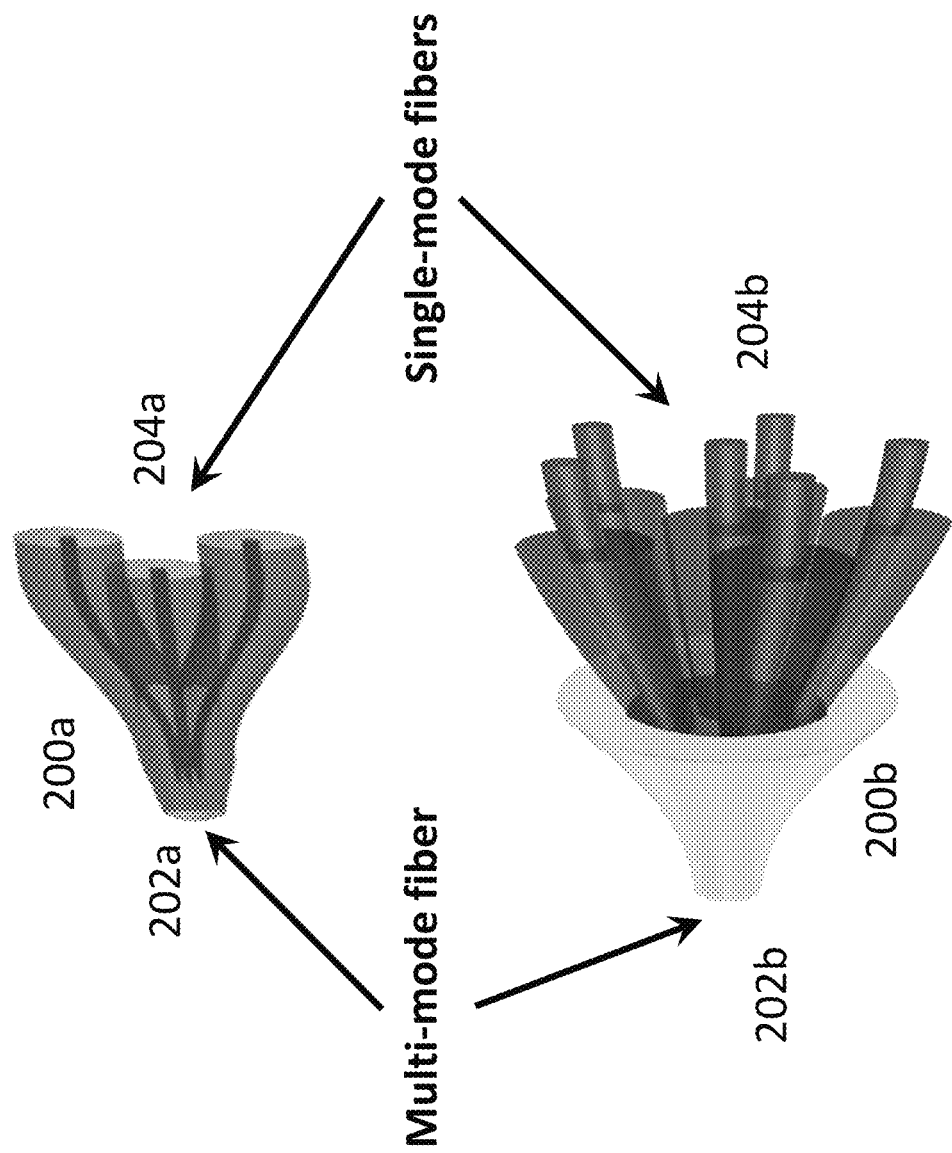
FIG. 2 shows different photonic lanterns.

Photonic Lanterns for Unitary Mapping of Multi-Mode Signals to Single-Mode Outputs FIG. 2 illustrates a pair of photonic lanterns 200a and 200b (collectively, photonic lanterns 200) that uniquely and repeatably map spatial modes at a multi-mode input to respective single-mode outputs. Photonic lanterns 200 were originally developed for astronomy applications; more specifically, for using single-mode optical devices with large telescopes. Today, they are also used for space-division multiplexing in fiber telecommunications, signal combining in high-energy lasers, and sensing in astronomy.

Each of the photonic lanterns 200 shown in FIG. 2 is suitable for use as a passive mode converter in a multi-spatial mode enabled PAT and AO terminal for free-space optical communications. Like at least some other passive mode converters, each of the photonic lanterns 200 performs a unitary mapping of a multi-mode signal to many single-mode outputs, with one single-mode output for each spatial mode of the multi-mode signal for optimal performance. The number of supported spatial modes depends on the size of the multi-mode fiber and the number of single-mode fibers fused together to make the photonic lantern.

For example, the photonic lantern 200a at the top of FIG. 2 supports three modes thanks to a three-mode fiber input 202a and three single-mode fiber outputs 204a. The photonic lantern 200b at the bottom of FIG. 2 supports six modes thanks to a six-mode fiber input 202b and six single-mode fiber outputs 204b. Other photonic lanterns may support more modes, with the number of modes depending in part on the geometric packing arrangement of the fibers and the core diameter of the fibers, which at a wavelength of 1550 nm may be 8 μm (one mode), 15 μm (three modes), 21 μm (six modes), or any other suitable value.

Figure 3:
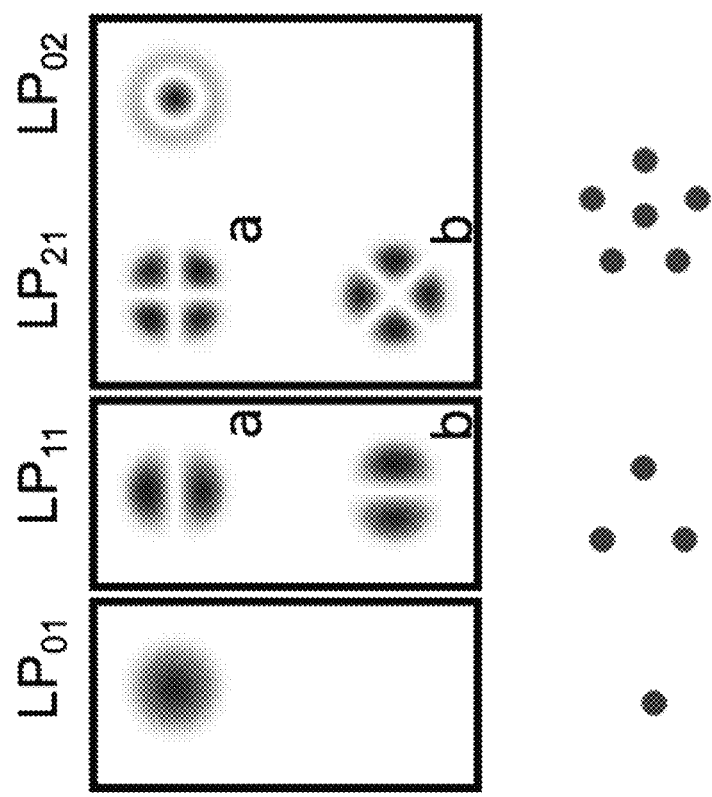
FIG. 3 shows the field profile of a set of guided spatial modes (top) at the multi-mode input of a photonic lantern supported by a set of single-mode outputs (bottom) of the same photonic lantern; each set of single-mode fibers supports the modes directly above and to the left.

FIG. 3 shows the unitary mapping of the spatial modes of a multi-mode signal (top) to single-mode outputs (bottom) of the six-moded photonic lantern 200b in FIG. 2. In a mode-preserving photonic lantern, exciting the $LP_{01}$ mode of the photonic lantern's multi-mode input produces light at one of the photonic lantern's single-mode outputs 204b. Exciting the $LP_{01}$ and both $LP_{11}$ modes of the photonic lantern's multi-mode input 202b produces light at three of the photonic lantern's single-mode outputs 204b. And exciting the $LP_{01}$, both $LP_{11}$, both $LP_{21}$, and the $LP_{02}$ modes of the photonic lantern's multi-mode input 202b produces light at six of the photonic lantern's single-mode outputs 204b.

Other unitary photonic lanterns may not preserve spatial modes as described above. Instead, each of the single-mode outputs of the unitary photonic lantern may contain energy from each of the modes in the few-mode fiber. The exact transfer function from the few-mode fiber to each of the single-mode outputs is unique to a particular photonic lantern and repeatable, although it may vary with temperature. The transfer function can be learned by calibrating the unitary photonic lantern over its expected wavelength and temperature operating ranges.

Because each photonic lantern output is a single spatial mode (and temporally coherent), it can be coherently combined with other temporally coherent signals. For instance, all of the photonic lantern outputs can be coherently combined with each other. Using an array of parallel coherent receivers, each single-mode fiber signal can be coherently detected and digitized. Then, digital signal processing (DSP) enables timing aligning and phase aligning the signals for coherent combining. A maximal ratio combining algorithm to determine the complex weights allows for optimal combining. In this way, the signals with higher SNR are weighted more and the signals with lower SNR are weighted less.

Photonic Lantern PAT System

FIGS. 4A-4F illustrate an optical terminal (PAT system) 400 with a passive mode demultiplexer, shown here as a photonic lantern 420, that maps spatial modes in a multi-mode free-space optical beam to single-mode fiber outputs 436a-436c. Terminals like this one can be used as receivers in ground-to-ground, air-to-ground, space-to-ground, air-to-space, space-to-space, underwater-to-underwater, underwater-to-air, and underwater-to-space free-space optical communications links. Unlike in other PAT systems, where a significant portion of the received light may be used for PAT instead of communications, all of the light received by the system 400 (neglecting insertion loss) contributes to generation of the communications signal. This increases dynamic range and improves sensitivity.

Figure 4B:
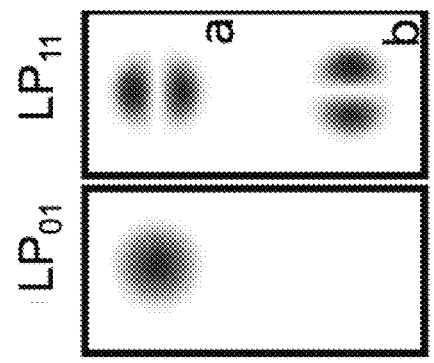
FIG. 4B shows the set of guided spatial modes at the multi-mode input of the photonic lantern in FIG. 4A.
Figure 4A:
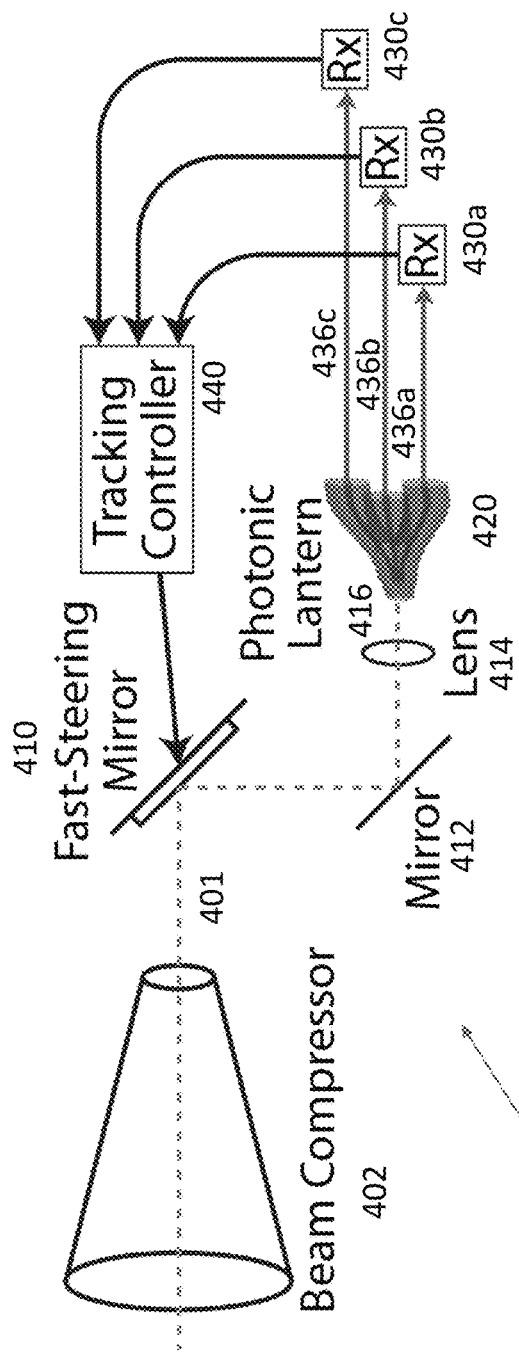
FIG. 4A shows a PAT system with a photonic lantern for passive mode conversion of the different spatial modes in a free-space optical communications beam into different single-mode fiber outputs for adaptive optical compensation.

FIG. 4A shows that the optical terminal 400 includes a telescope (beam compressor) 402 that receives a free-space optical communications beam 401 from a transmitter, such as a satellite or aircraft (not shown). When the free-space optical communications beam 401, it may include light propagating in many spatial modes due to atmospheric turbulence or other environmental perturbations. The telescope 402 couples the received beam 401 into the multi-mode input 416 of a photonic lantern 420 via an adaptive optical element 410, such as a fast-steering mirror, and optional additional optical elements, such as the mirror 412 and lens 414 in FIG. 4A. This multi-mode input 416 supports the three spatial modes shown in FIG. 4B. Because the input 416 supports several spatial modes, its coupling efficiency is higher over a wider range of input angles than that of a single-mode fiber.

Figure 5A:
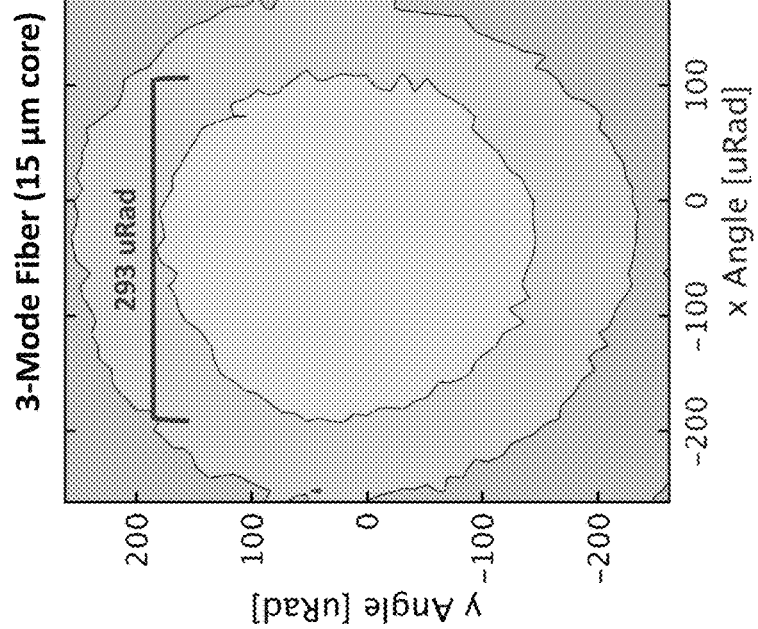
FIG. 5A shows a measured acceptance mode profile for a single-mode fiber with an 8 μm core at a wavelength of 1550 nm.
Figure 5B:
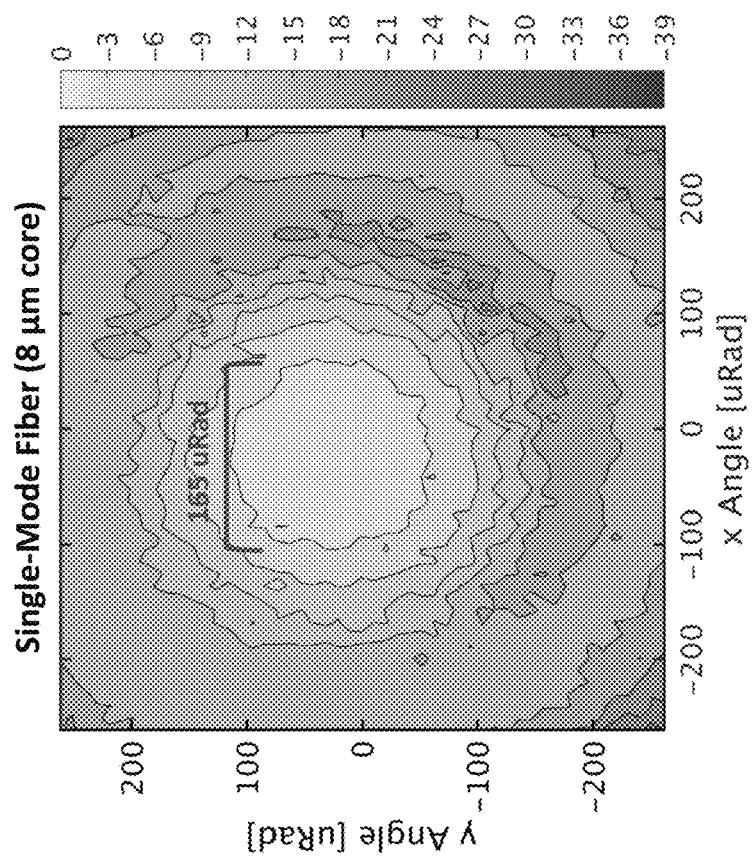
FIG. 5B shows a measured acceptance mode profile for a three-mode fiber with a 15 μm core at a wavelength of 1550 nm.

This higher coupling efficiency is shown in FIGS. 5A and 5B, which are contour plots of coupled intensity at a wavelength of 1550 nm versus x and y input angles for an 8 μm single-mode fiber core and a 15 μm three-mode fiber core (e.g., input 416 of the photonic lantern 420), respectively. (Fibers and photonic lanterns that operate at other wavelengths may have different core diameters, depending on the number of spatial modes that they support.) The 3 dB, one-dimensional acceptance angle for the three-mode fiber core is 293 μrad versus 165 μrad for the single-mode fiber core. In addition, the coupled intensity for the three-mode fiber core falls off much less quickly with angle than it does for the single-mode fiber core as shown by the extra contours in FIG. 5A. The wider acceptance angle of the multi-mode core relaxes mechanical tolerances on the terminal 400.

The optical terminal in FIG. 4A has a photonic lantern 420 that with an input 416 supports three spatial modes and three single-mode outputs 436. Other optical terminals may have photonic lanterns that support tens to hundreds of spatial modes and matching numbers of single-mode outputs. Photonic lanterns with multi-mode outputs may be cascaded with photonic lanterns with single-mode outputs to handle higher numbers of spatial modes (e.g., hundreds of spatial modes). Increasing the mode count enables higher-order wave-front characterization, which could be used for adaptive optics.

The photonic lantern 420 maps each excited spatial mode at the input 416 to a different single-mode output 436a-436c, which are in turn optically coupled to respective receivers 430a-430c. These receivers 430a-430c can be coherent receivers, incoherent receivers, or a mix of coherent and incoherent receivers as explained below. If implemented as a coherent receiver, a receiver 430 may include a photodetector that senses interference between the corresponding single-mode output 436 and a local oscillator. The photodetector produces a photocurrent or other electrical signal whose amplitude is the intensity function of the magnitude and phase of the corresponding spatial mode excited at the multi-mode input to the photonic lantern. The photodetector feeds this electrical signal back to a digital signal processor (DSP) 440, which demodulates the communications signal and derives tip/tilt feedback information from the electrical signals from all of the receivers 430.

The DSP 440 actuates the fast-steering mirror 410 based on the tip/tilt feedback information to compensate for line-of-sight fluctuations (jitter) between the optical terminal 400 and transmitter, wave-front distortion due to atmosphere turbulence, etc. The tip/tilt feedback information is an error signal for a PAT control loop with offsets in both the x and y directions. The DSP 440 attempts to reduce or minimize these offsets, which correspond to a maximum in coupled power. For instance, the DSP 440 may adjust tip and/or tilt of the fast-steering mirror 410 to increase or maximize the total power across all of the receivers 430. Alternatively, the DSP 440 may adjust the fast-steering mirror 410 to increase or maximize the total power at a particular receiver 430 or subset of receivers 430, e.g., only those receivers used for communications as shown in FIG. 4D.

In either situation, the DSP 440 may use either a power measurement or the distribution of power measurements across all receivers 430 to generate the error signals for driving the fine-steering mirror 401. This can be done in a very deterministic way as shown in the contour plots in FIGS. 5A and 5B. The input wave front leads to a point in an N-dimensional space where N is the number of single mode output fibers based in the ratio of the powers in the single mode fibers. This point can be evaluated against entries in a lookup table generated via a prior calibration. The nearest point in the lookup table to the observed point corresponds to the estimated error in angle in two dimensions. With increasing tilt error, the overall energy sum seen at all of the SMFs 436 decreases.

Figure 4C:
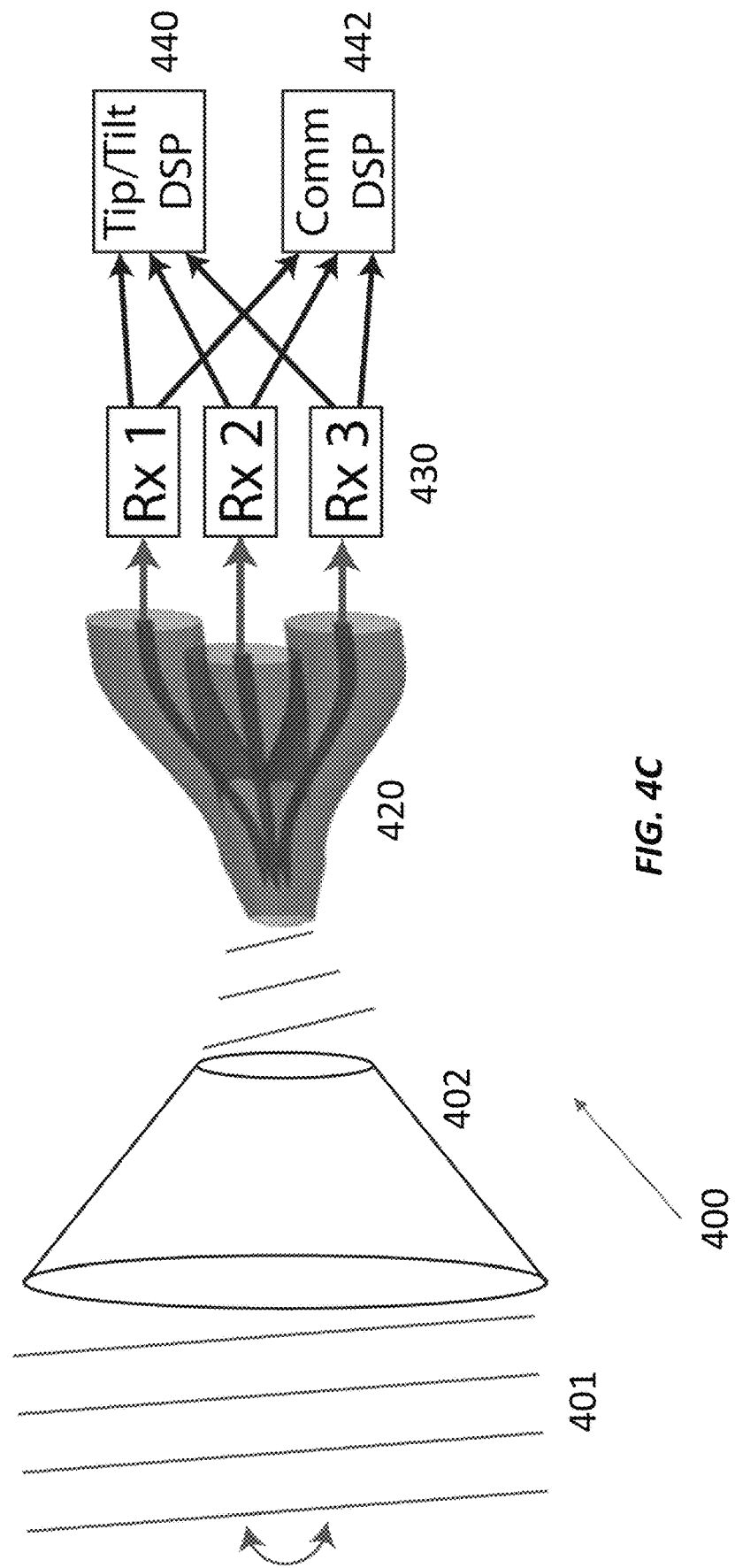
FIG. 4C shows simultaneous PAT and free-space optical communications using the PAT system of FIG. 4A.

FIG. 4C illustrates the telescope 402, photonic lantern 420, and receivers 430 of the optical terminal 400. The telescope 402 couples the beam 401, which is shown as a plane wave-beam, into the three-mode photonic lantern 420, which maps each spatial mode to a corresponding single-mode output 436a-436c. Respective photodetectors 430a-430c transduce these single-mode outputs 436a-436c into electrical signals that are coupled to both a communications DSP 442 and a tip/tilt DSP 440. Each photodetector 430 may be a high-bandwidth receiver (e.g., 100 kHz, 1 GHz, 1 MHz, 10 MHz, 100 MHz, 10 GHz, 20 GHz, 40 GHz, or higher) for high-speed (optionally coherent) detection. (Alternatively, the separate DSPs 440 and 442 can be replaced by a single processor that handles both communications and adjusting the fast-steering mirror 410.) The communications DSP 442 demodulates the electrical signals, while the tip/tilt DSP 440 uses the amplitude variation among the electrical signals from the receivers 430 to actuate an adaptive optical element (fast-steering mirror 410 in FIG. 4A) for higher beam-coupling efficiency into the photonic lantern 420.

Figure 4D:
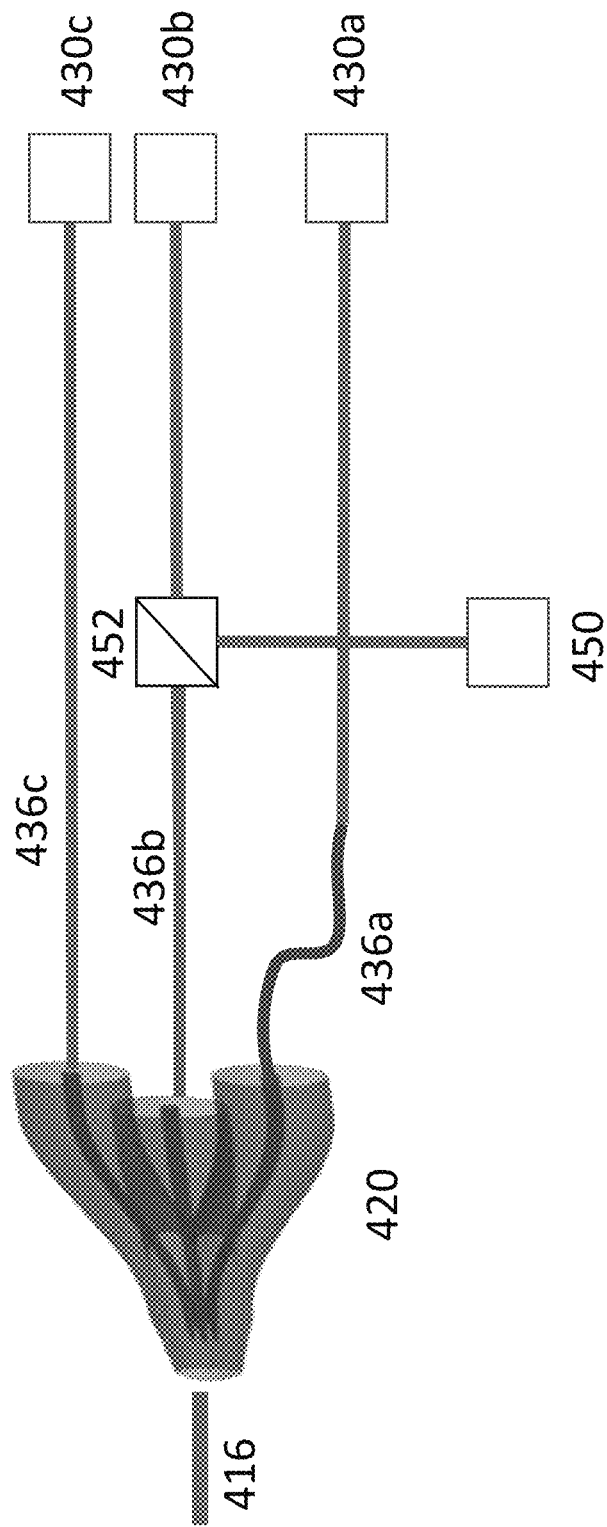
FIG. 4D shows the PAT system of FIG. 4A with a high-bandwidth coherent receiver for communication and low-bandwidth incoherent receivers for sensing tilt angles.

FIG. 4D shows an alternative photodetector architecture for the system 400 in FIG. 4A with low-speed photodiodes 436a and 436c that provide pointing information and one or more high-speed receivers 436b that provide both pointing information and communications. In this architecture, the low-speed (e.g., less than 1 GHz, 100 kHz, or 10 kHz) photodiodes 430a and 430c are coupled to some single-mode photonic lantern outputs 436a and 436c and high-bandwidth (e.g., 1 GHz, 10 GHz, or higher) receivers 430b are coupled to other single-mode photonic lantern outputs 436b. The low-speed photodiodes 436a and 436c have bandwidths high enough to generate error signals for closed-loop feedback to the fast-steering mirror 410. And the high-speed photodiode 430b has a bandwidth of least twice the Nyquist sampling frequency of the communications signal. In systems with fast and slow photodetectors, the photonic lantern may be configured so that most if not all of the energy in the fundamental mode comes out of one of the single-mode outputs coupled to a fast photodetector for higher overall throughput.

In this case, the carrier frequency of the signal detected by the high-speed photodiode 430b can be down-converted by combining the single-mode output beam with a heterodyne reference beam from a local oscillator 450, e.g., via an optional beam splitter 452. The high-speed photodiode 430b detects the resulting heterodyne beat for both high-speed communications and generating error signals for closed-loop steering feedback. Heterodyne detection also enables more sensitive measurement than incoherent detection.

Figure 4E:
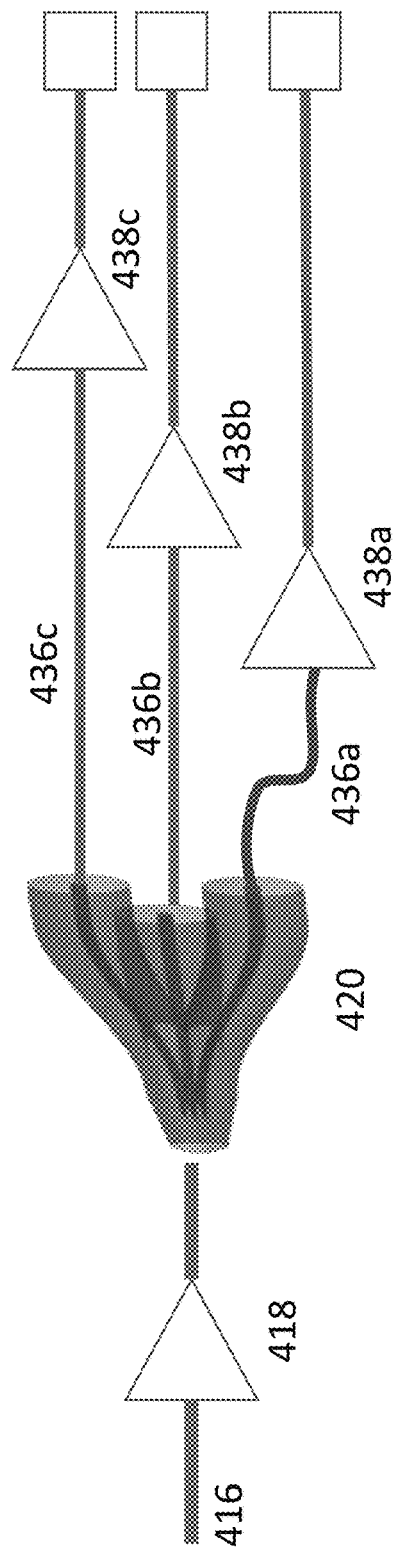
FIG. 4E shows optional optical amplifiers coupled to the multi-mode input and single-mode outputs of the photonic lantern in FIG. 4A.

If power is an issue, the PAT system 400 can include optical amplifiers 418 and 438 to boost the signal strength as shown in FIG. 4E. These optical amplifiers 418 and 438 can be positioned at the input and outputs, respectively, of the photonic lantern 420. Placing the optical amplifiers 418 and 438 causes their noise figures to cascade, with the noise figure $F_1$ and gain $G_1$ of the first optical amplifier in the series (here, optical amplifier 418) dominating over the noise figure $F_2$ of the second optical amplifier (optical amplifier(s) 438) in the total noise figure: $F_{total}=F_1+(F_2-1)/G_1$. By selecting optical amplifier 418 to have a low noise figure and moderate gain (e.g., a noise figure of 3 dB to 4 dB and a gain of 13 dB to 20 dB, or 5 dB to 10 dB per mode), the other optical amplifiers 438 can have higher noise figures and gains (e.g., noise figures of 5 dB to 8 dB and gains of 20 dB to 60 dB) without impacting system noise performance.

Figure 4F:
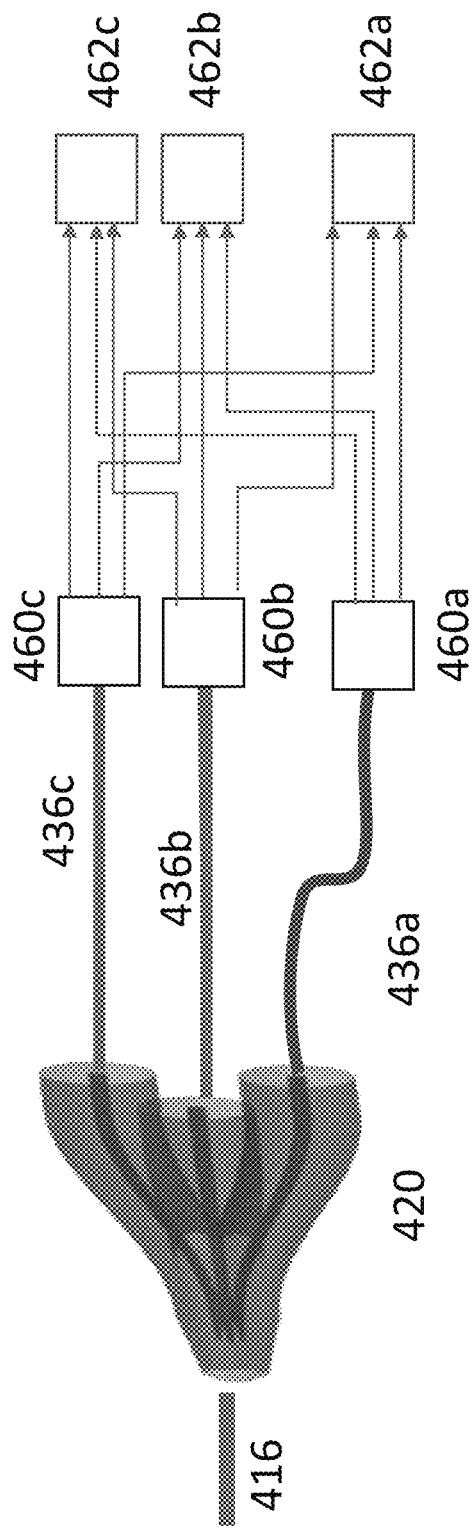
FIG. 4F shows the PAT system of FIG. 4A with wavelength-division demultiplexers sending single-mode outputs at different wavelengths to dedicated detectors.

FIG. 4F shows how the architecture of the system 400 in FIG. 4A can be modified for wavelength division multiplexed (WDM). Few-mode fiber coupling allows multiple simultaneous communication beams to be received at the different wavelengths. That is, the photonic lantern 420 can map light at different spatial modes to unique spatial modes for multiple wavelengths simultaneously. This multi-wavelength compatibility can be exploited by receiving a WDM free-space optical communications beam with the photonic lantern 420 and coupling light in the different spatial modes (and wavelengths) to different single-mode outputs 436 as explained above. Each single-mode output may emit light at one or more of the WDM wavelengths, depending in part on the spatial mode distribution of the light at the input 416 to the photonic lantern 420. One or more WDM demultiplexers 460a-460c (e.g., arrayed waveguide gratings) splits the WDM beams at the single-mode outputs 436a-436c into the separate WDM channels. Each WDM channel or set of WDM channels is coupled to a dedicated receiver or receiver array 462a-462c as shown in FIG. 4F.

Experimental Measurements

Figures 6A, 6B, 6C:
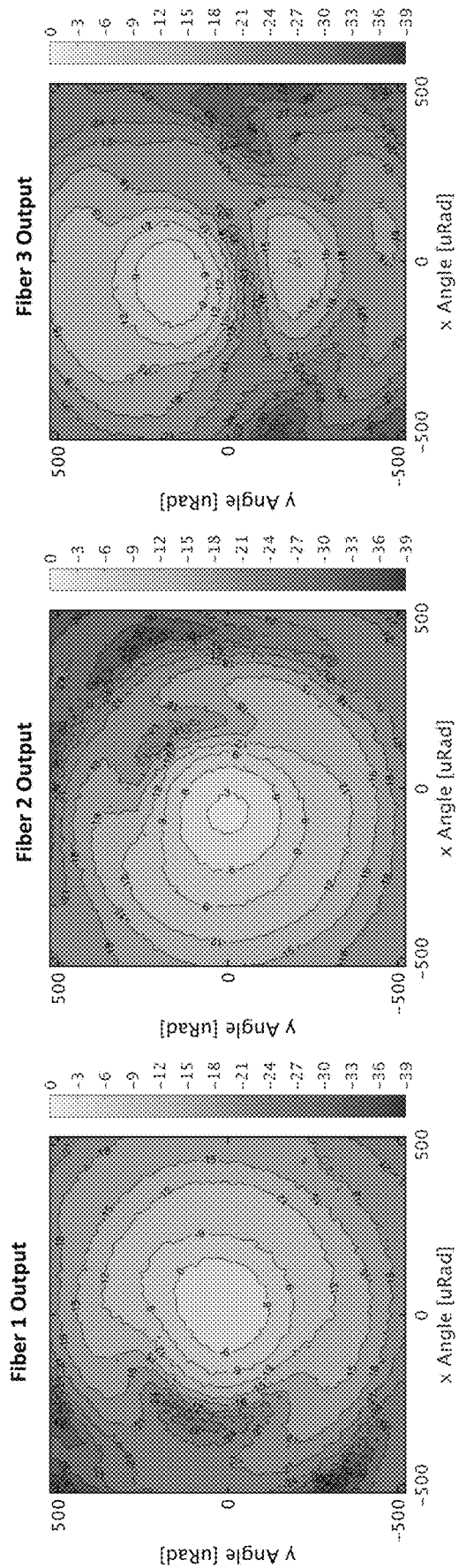
FIGS. 6A-6C show intensity contours of light mapped to the three single-mode fibers in the photonic lantern in the PAT system of FIG. 4A for different input angles.

FIGS. 6A-6C show experimental measurements of optical power measured at three single-mode outputs of a three-mode photonic lantern as a function of two-dimensional angle of arrival for a beam coupled into the three-mode photonic lantern. The outputs are stable over time, may depend on temperature, and are unique for each photonic lantern. The photonic lantern efficiently collects the tilted wave front, with all collected power going to the communications processor (neglecting insertion loss, etc.). The tip/tilt processor uses the post-detected electronic signals to determine the x and y discriminants of the collected wave fronts for increasing the optical coupling efficiency into the photonic receiver by actuating the adaptive optical element.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for pointing, acquiring, and tracking (PAT) a free-space optical communications beam, the system comprising:
    a beam compressor to receive the free-space optical communications beam;
    an adaptive optical element, in optical communication with the beam compressor, to modulate a wave front of the free-space optical communications beam;
    a passive mode demultiplexer, in optical communication with the adaptive optical element, to perform a unitary mapping of spatial modes of the free-space optical communications beam to single-mode outputs;
    photodetectors, in optical communication with the single-mode outputs of the passive mode demultiplexer, to transduce light at the single-mode outputs into electrical signals; and
    at least one processor, operably coupled to the photodetectors, to actuate the adaptive optical element based on the electrical signals.

2. The system of claim 1, wherein each of the photodetectors has a bandwidth of at least 1 GHz.

3. The system of claim 1, wherein the photodetectors comprise:
    a first photodetector having a first bandwidth to sense a power of the corresponding single-mode output; and
    a second photodetector having a second bandwidth greater than the first bandwidth to sense a power of the corresponding single-mode output and to detect a modulation of the corresponding single-mode output.

4. The system of claim 3, wherein the first bandwidth is less than 1 GHz and the second bandwidth is at least 1 GHz.

5. The system of claim 1, wherein the at least one processor comprises:
    a tracking controller to determine actuation of the adaptive optical element based on the electrical signals; and
    a communications receiver to demodulate the electrical signals to provide a communications signal.

6. The system of claim 5, wherein the tracking controller is configured to actuate the adaptive optical element based on an amplitude distribution of the electrical signals among the photodetectors.

7. The system of claim 1, further comprising:
    an input optical amplifier, in optical communication with an input to the passive mode demultiplexer, to amplify the free-space optical communications beam; and
    output optical amplifiers, in optical communication with the single-mode outputs, to amplify the light at the single-mode outputs.

8. The system of claim 1, wherein the free-space optical communications beam is a wavelength-division multiplexed (WDM) free-space optical communications beam, and further comprising:
    a wavelength division de-multiplexer, in optical communication with one of the single-mode outputs, to de-multiplex the corresponding single spatial mode.

9. The system of claim 1, further comprising:
    a local oscillator to interfere a local oscillator beam with at least one of the single spatial modes.

10. A method of pointing, acquiring, and tracking (PAT) a free-space optical communications beam, the method comprising:
    modulating a wave front of the free-space optical communications beam with an adaptive optical element;
    performing a unitary mapping of spatial modes of the free-space optical communications beam to single spatial modes;
    transducing the respective single spatial modes into respective electrical signals; and
    actuating the adaptive optical element based on the respective electrical signals.

11. The method of claim 10, wherein transducing the respective single spatial modes occurs over a bandwidth of at least 1 GHz.

12. The method of claim 10, wherein transducing the respective single spatial modes comprises:
    detecting a first single spatial mode over a first bandwidth with a first photodetector;
    detecting a second single spatial mode over a second bandwidth greater than the first bandwidth with a second photodetector; and
    demodulating a communication signal encoded in the free-space optical communications beam from an output of the second photodetector.

13. The method of claim 12, wherein the first bandwidth is less than 1 GHz and the second bandwidth is at least 1 GHz.

14. The method of claim 10, further comprising:
determining an error signal for actuating the adaptive optical element based on the electrical signals; and
demodulating a communication signal encoded in the free-space optical communications beam from at least one of the electrical signals.

15. The method of claim 14, wherein determining the error signal is based on an amplitude distribution of the electrical signals.

16. The method of claim 10, further comprising:
amplifying the free-space optical communications beam before performing the unitary mapping of the spatial modes of the free-space optical communications beam to the single spatial modes; and
amplifying the single spatial modes.

17. The method of claim 10, wherein the free-space optical communications beam is a wavelength-division multiplexed (WDM) free-space optical communications beam, and further comprising:
wavelength de-multiplexing at least one of the single spatial modes.

18. The method of claim 10, wherein transducing the respective single spatial modes into the respective electrical signals comprises coherently detecting at least one of the single spatial modes.

19. The method of claim 18, wherein transducing the respective single spatial modes into the respective electrical signals further comprises incoherently detecting at least one of the single spatial modes.

20. A system for pointing, acquiring, and tracking (PAT) a free-space optical communications beam encoding a communications signal, the system comprising:

an adaptive optical element to modulate a wave front of the free-space optical communications beam in response to an error signal;

a photonic lantern, having a multi-mode input in optical communication with the adaptive optical element and supporting N spatial modes and having N single-mode outputs, to map spatial modes of the free-space optical communications beam at the multi-mode input to single-mode outputs, where N is a positive integer greater than 1;

a first photodetector, in optical communication with a first single-mode output of the photonic lantern and having a first bandwidth, to generate a first electrical signal from light at the first single-mode output;

a second photodetector, in optical communication with a second single-mode output of the photonic lantern and having a second bandwidth greater than the first bandwidth, to generate a second electrical signal based on light at the second single-mode output; and at least one processor, operably coupled to the first photodetector and the second photodetector, to generate the error signal based on amplitudes of the first electrical signal and the second electrical signal and to demodulate the communications signal from the second electrical signal.

* * * * *